(12) United States Patent
Jeon

(10) Patent No.: US 7,313,870 B2
(45) Date of Patent: Jan. 1, 2008

(54) HEADLAMP AIMING APPARATUS FOR VEHICLES

(75) Inventor: Seon-Gyu Jeon, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 11/299,360

(22) Filed: Dec. 8, 2005

(65) Prior Publication Data
US 2007/0089308 A1 Apr. 26, 2007

(30) Foreign Application Priority Data
Oct. 26, 2005 (KR) ...................... 10-2005-0101284

(51) Int. Cl.
*G01B 5/255* (2006.01)
(52) U.S. Cl. .................... 33/288; 33/203; 33/203.12
(58) Field of Classification Search .................. 33/286, 33/613, 335, 288, 227, 203, 203.12, 203.13, 33/203.15
See application file for complete search history.

(56) References Cited

U.S. PATENT DOCUMENTS

| | | | | |
|---|---|---|---|---|
| 2,314,559 A | * | 3/1943 | Schilling | ...................... 33/288 |
| 4,726,122 A | * | 2/1988 | Andersson | ..................... 33/288 |
| 5,078,490 A | * | 1/1992 | Oldweiler et al. | ............. 33/288 |
| 6,070,332 A | * | 6/2000 | Kane | ........................ 33/203.13 |
| 6,363,619 B1 | * | 4/2002 | Schirmer et al. | ............. 33/288 |
| 6,483,577 B2 | * | 11/2002 | Stieff | ....................... 33/203.12 |
| 6,823,601 B2 | * | 11/2004 | Murray | ........................ 33/288 |

FOREIGN PATENT DOCUMENTS

| | | |
|---|---|---|
| JP | 55107907 | 8/1980 |
| JP | 05087686 | 4/1994 |
| JP | 06273274 | 9/1994 |

* cited by examiner

*Primary Examiner*—Yaritza Guadalupe-McCall
(74) *Attorney, Agent, or Firm*—Morgan Lewis & Bockius LLP

(57) ABSTRACT

A headlamp aiming apparatus for vehicles used for accurate measuring of light radiated from the headlamp of a vehicle. The headlamp aiming apparatus is capable of appropriately calibrating the moving quantity of an aiming unit, based on data measured by distance measuring units measuring the positions of respective wheels of a vehicle, during a headlamp aiming operation, thus accurately aligning the center of the headlamp with the center of the headlamp aiming apparatus.

4 Claims, 4 Drawing Sheets

HEADLAMP AIMING APPARATUS FOR VEHICLES

CROSS-REFERENCE TO RELATED APPLICATIONS

The present application is based on, and claims priority to Korean Application Serial Number 10-2005-0101284, filed on Oct. 26, 2005, the disclosure of which is hereby incorporated by reference herein in its entirety.

FIELD OF THE INVENTION

The present invention relates to a headlamp aiming apparatus for vehicles and, more particularly, to an apparatus for measuring light intensity, light quantity, an optical axis, etc. of a vehicle headlamp.

BACKGROUND OF THE INVENTION

A headlamp aiming apparatus is equipment that measures light radiated from a headlamp of a vehicle in order to measure light intensity, light quantity, optical axis, and other characteristics of the light radiated from a headlamp. This information is used for determining whether these characteristics satisfy requirements established in regulations.

The headlamp aiming apparatus is arranged at a position spaced apart from the headlamp by a predetermined distance and measures light transmitted from the headlamp. Therefore, accurate measurement is extremely difficult unless the center of the headlamp is precisely aligned with the center of the headlamp aiming apparatus.

Particularly, in a headlamp aiming operation of adjusting the state of the headlamp mounted to the vehicle using the headlamp aiming apparatus, during the manufacture of the vehicle, work must be conducted after the center of the headlamp aiming apparatus is precisely aligned with the center of the headlamp. Otherwise, the light transmitted from the headlamp of the vehicle may be inaccurately measured.

SUMMARY OF THE INVENTION

Embodiments of the present invention provide a headlamp aiming apparatus for vehicles, which allows the center of a headlamp to be precisely aligned with the center of the headlamp aiming apparatus during a headlamp aiming operation of appropriately adjusting the headlamp mounted to a vehicle, thus making possible reliable adjustment of the headlamp of the vehicle.

A headlamp aiming apparatus for vehicles according to an embodiment of the present invention includes a distance measuring unit mounted to a side of each of four wheels of a vehicle. A guide rail is horizontally installed in front of the vehicle. An aiming unit is installed to be rectilinearly moved along the guide rail. Further, a controller controls the aiming unitbased on data measured by the distance measuring unit.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, the preferred embodiment of the present invention will be described with reference to the accompanying drawings.

Figure 1:
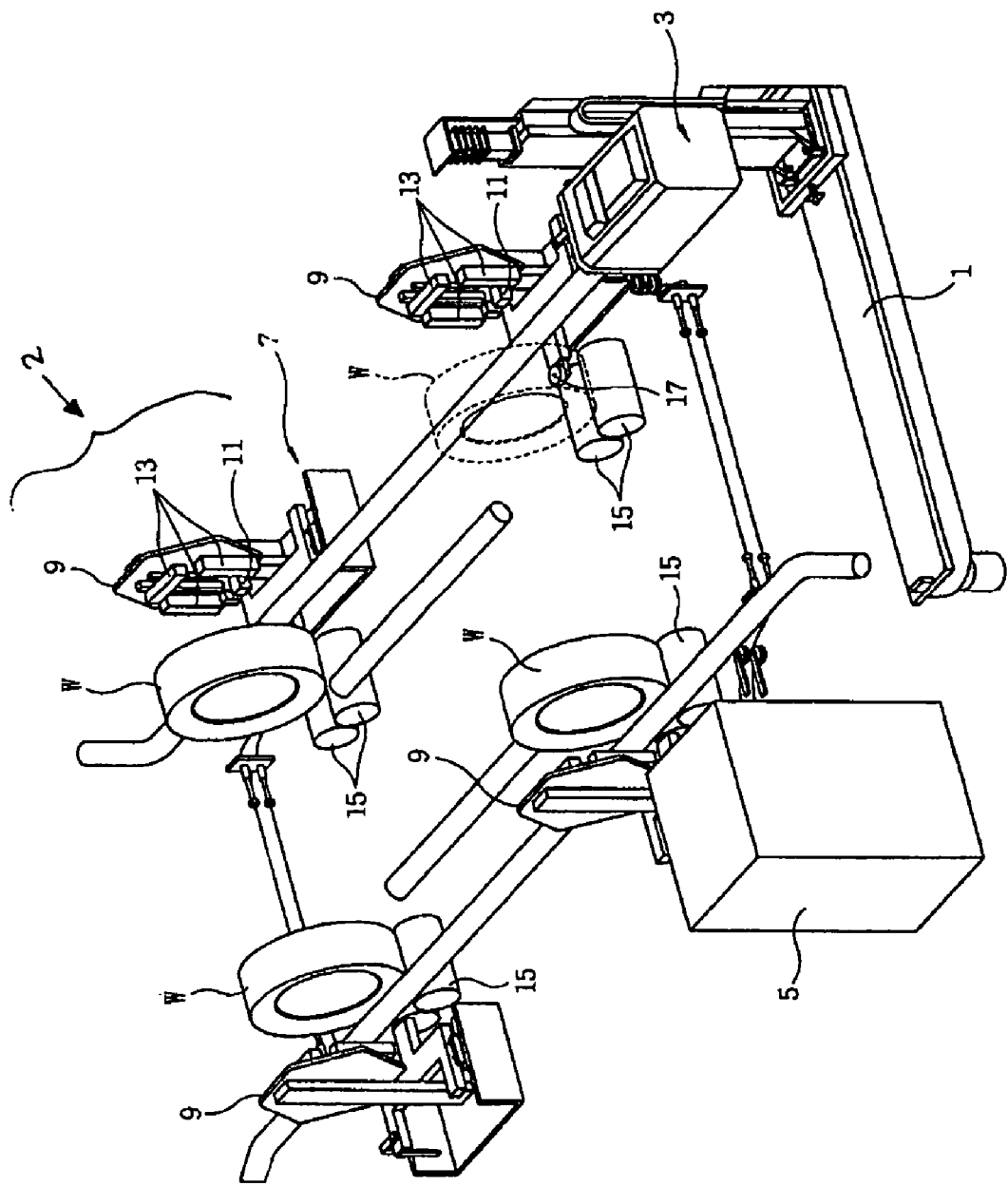
FIG. 1 illustrates a headlamp aiming apparatus for vehicles, according to the present invention.
Figure 2:
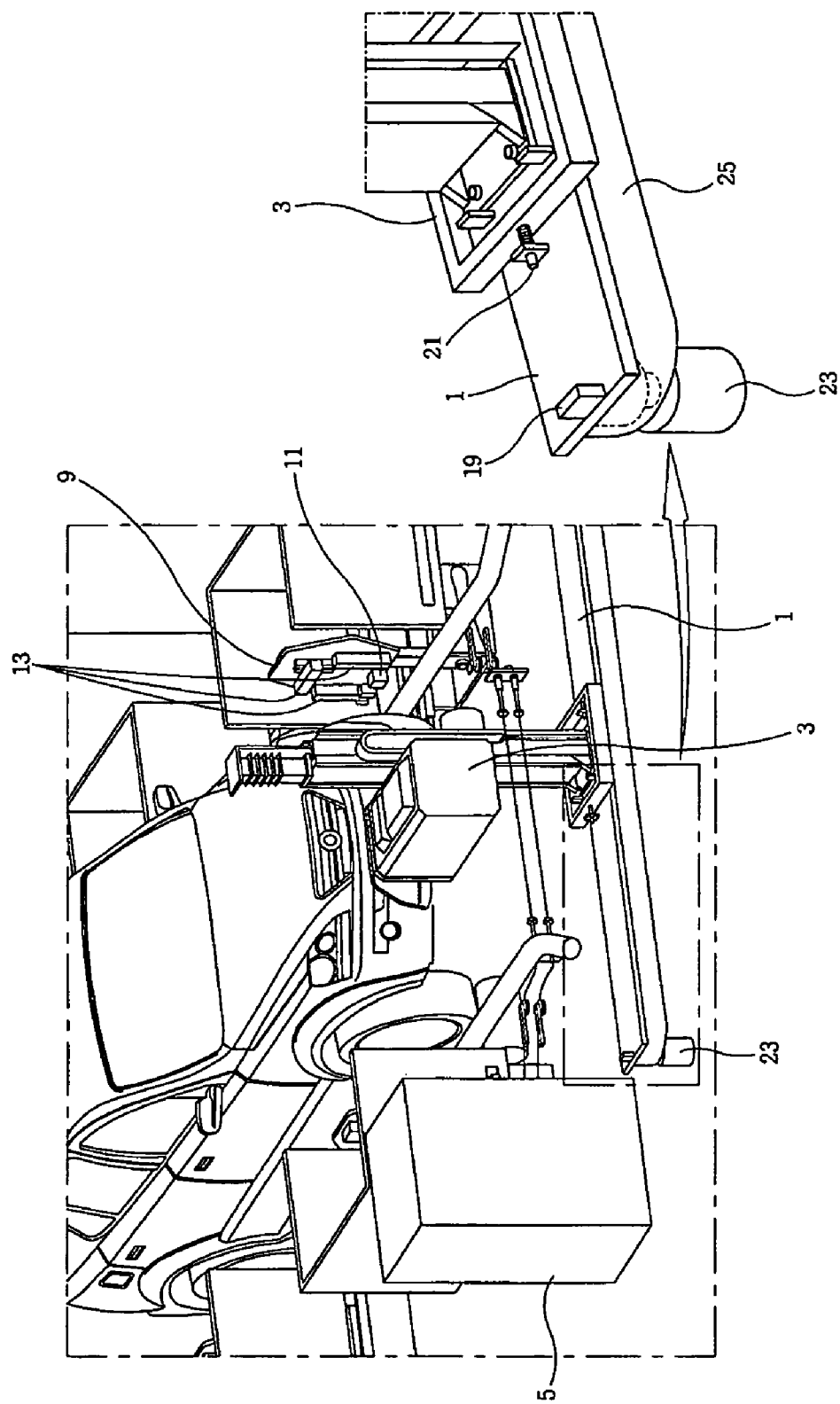
FIG. 2 illustrates the implementation of the headlamp aiming apparatus for vehicles, according to the present invention.
Figure 3:
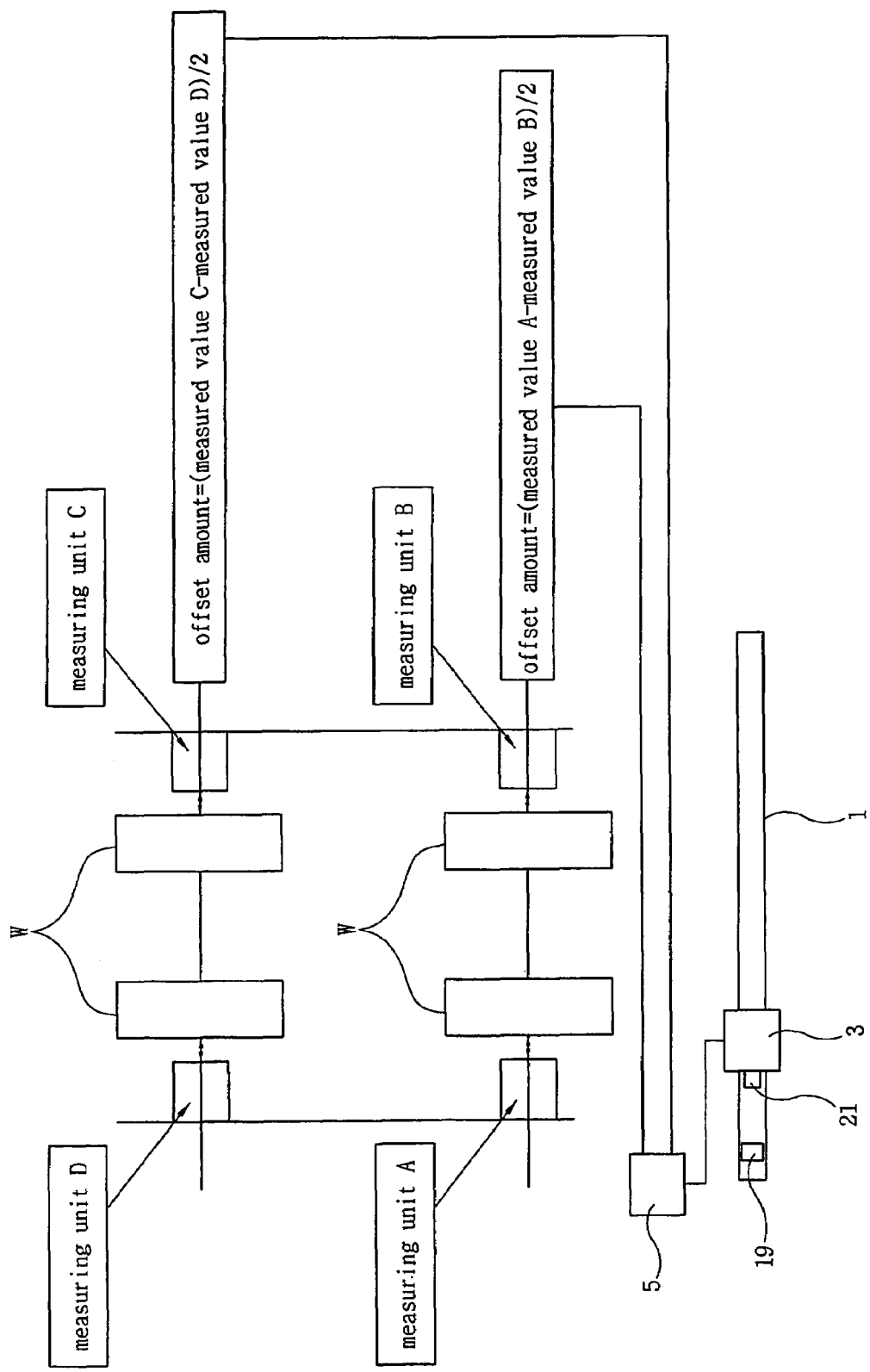
FIG. 3 diagrammatically depicts the operation of the headlamp aiming apparatus for vehicles, according to the present invention.

Referring to FIGS. 1 to 3, the headlamp aiming apparatus of the present invention includes distance measuring units 2, which include a measuring panel 9, alignment measuring sensors 13, and a laser distance measuring unit 11. The headlamp aiming apparatus also includes a guide rail 1, an aiming unit 3, and a controller 5. Each distance measuring unit 2 is mounted to the side of each of the four wheels of a vehicle. The guide rail 1 is horizontally installed in front of the vehicle. The aiming unit 3 is installed to rectilinearly move along the guide rail 1. The controller 5 controls the aiming unit 3 based on data measured by the distance measuring units 2.

According to one embodiment, the distance measuring units 2 include laser distance measuring units 11, each of which are mounted to each of the four measuring panels 9 of a wheel alignment measuring device 7 having a vehicle centering function.

Alignment measuring sensors 13 are mounted on each of the measuring panels 9 to measure wheel alignment, and each laser distance measuring unit 11 is installed to measure the distance from an associated measuring panel 9 to the center of an adjacent wheel.

The wheel alignment measuring device 7 is a known art. That is, when wheels W of the vehicle are raised and placed on rollers 15, a centering cylinder mounted to the side of each wheel W presses the side of the wheel W to an associated centering roller 17, thus moving and centering the vehicle. A wire and a tension spring connect the centering rollers 17 on both sides of the vehicle provide for more accurate centering.

As described above, the method of centering the vehicle relative to the wheel alignment measuring device 7 using only the centering cylinders and the tension springs affords sufficient accuracy for the measurement of wheel alignment. However, the method does not enable an accurate headlamp aiming operation. Therefore, the above-mentioned construction is added to the conventional wheel alignment measuring device 7, thus providing the headlamp aiming apparatus for vehicles, therefore ensuring vehicle centering accuracy required for the headlamp aiming operation.

The reason why the headlamp aiming apparatus of the present invention is constructed using the conventional wheel alignment measuring device 7 is because the vehicle centering operation is previously performed in a wheel alignment measuring operation, and the headlamp aiming operation can be simultaneously executed during the wheel alignment measuring operation.

The guide rail 1 is installed in front of the wheel alignment measuring device 7, so that the aiming unit 3 may rectilinearly moved in a horizontal direction, in front of the vehicle. A stopper 19 is provided at a predetermined position on the guide rail 1, and a limit switch 21 is mounted to the aiming unit 3, and configurable to contact the stopper 19 so as to be operated in cooperation with the stopper 19. The controller 5 moves the aiming unit 3 along the guide rail 1, using data measured by the distance measuring units and a signal generated when the limit switch 21 contacts the stopper 19.

According to the embodiment shown in FIG. 2, the aiming unit 3 is rectilinearly moved by a servo motor 23 and a timing belt 25 which are installed on the guide rail 1. In other embodiments, the aiming unit 3 may be rectilinearly moved to a precise position on the guide rail 1 by other mechanisms, such as a rack and a pinion. The aiming unit 3 rectilinearly moves in a horizontal direction of the vehicle using the guide rail 1, and in addition, has a self-elevating structure. Thus, the position of the aiming unit 3 may be adjusted to correspond to the position of the headlamp of the vehicle.

Figure 4:
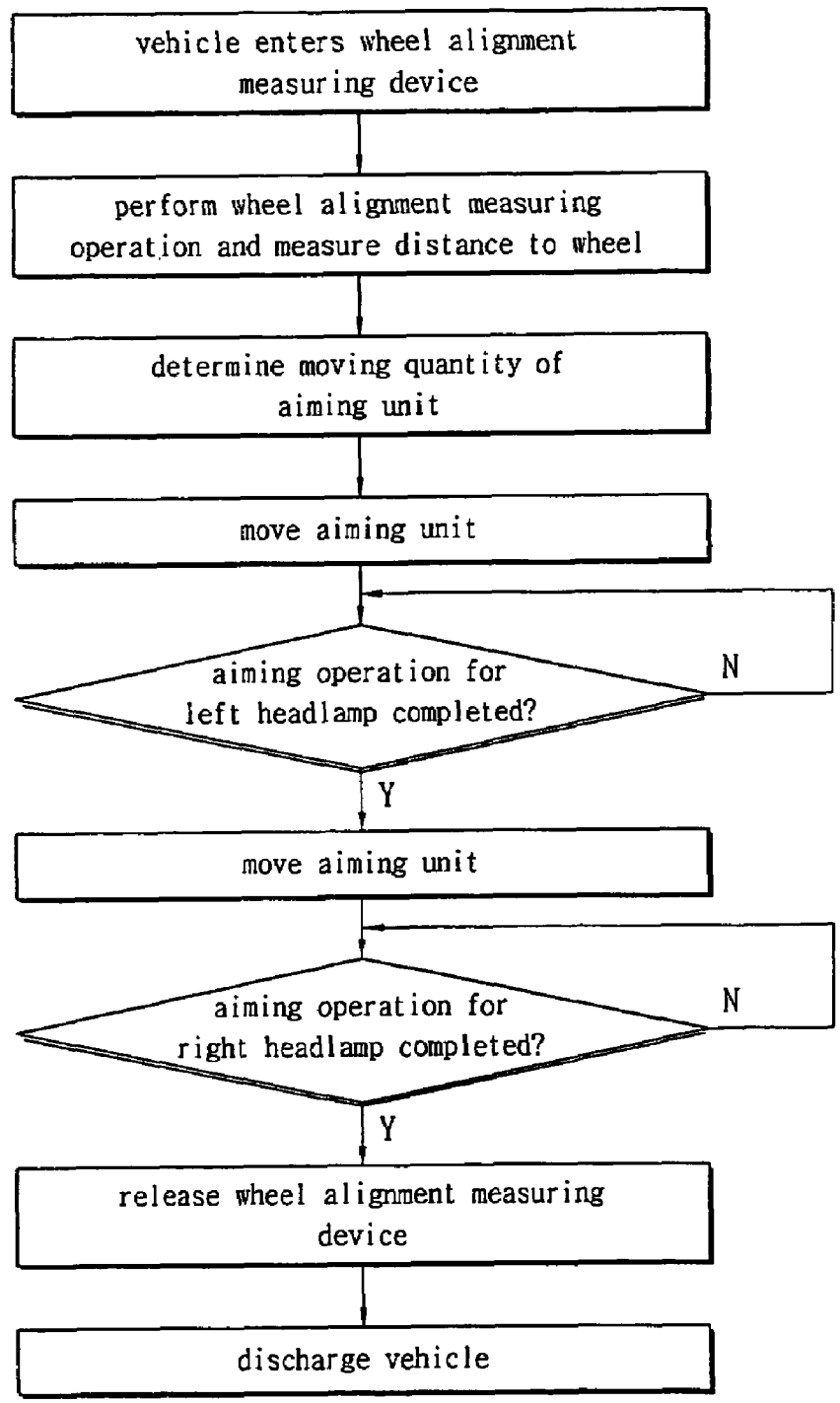
FIG. 4 is a flowchart illustrating the operation of the present invention.

The operation of the headlamp aiming apparatus will be described with reference to FIGS. 3 and 4.

When the vehicle enters the wheel alignment measuring device 7, the wheel alignment measuring device 7 performs a vehicle centering operation. Thereafter, the wheel alignment measuring operation is conducted by the wheel alignment measuring sensors 13 of the measuring panels 9. While the wheel alignment measuring operation is being performed, each of the laser distance measuring units 11 measures the distance between the center of an associated wheel and the corresponding measuring panel 9, prior to transmitting the measured result to the controller 5. The controller 5 analyzes data transmitted from the laser distance measuring units 11, and determines the distance to move the aiming unit 3.

In one embodiment as shown in FIG. 3, the laser distance measuring units 11 are classified into A, B, C, and D measuring units. When the vehicle is biased leftwards, for example, the distance between a wheel (front left wheel of the vehicle) adjacent to the B measuring unit and the associated measuring panel is 40 mm, and the distance between a wheel (front right wheel of the vehicle) adjacent to the A measuring unit and the associated measuring panel may be 100 mm. In that case, the offset amount calculated by the controller 5 becomes (100–40)/2=30 mm. In this case, the offset amount is obtained by subtracting the distance measured by the B measuring unit from the distance measured by the A measuring unit and dividing the difference in half.

Meanwhile, data (reference moving distances) on the distance to rectilinearly move the aiming unit 3 from the state where the limit switch 21 contacts the stopper 19 so as to correspond to the center of each of a left headlamp and a right headlamp have been previously input to the controller 5, according to the kind of vehicle to be measured.

The controller 5 sets the state where the limit switch 21 of the aiming unit 3 contacts the stopper 19 as a reference. Thus, the controller 5 rectilinearly moves the aiming unit 3 by the distance between the previously input reference moving distance and the offset amount, so that the center of the headlamp to be measured is horizontally aligned with the center of the aiming unit 3.

In the exemplary case, assuming that the reference moving distance regarding the left headlamp of a vehicle to be measured is 70 mm, the aiming unit 3 rectilinearly moves by 70 mm–30 mm=40 mm, starting from the position where the limit switch 21 contacts the stopper 19. Then, the accurate centering operation is realized.

Conversely, when the vehicle is biased rightward, the offset amount will be a negative number. If the value is subtracted from the reference moving distance (actually, addition is performed because the signs correspond), the aiming unit 3 is moved further rightwards so that the center of the aiming unit 3 is aligned with that of the headlamp of the vehicle to be measured.

Meanwhile, such a centering operation uses only values measured by the A and B measuring units. Values measured by the C and D measuring units, that is, values measuring the rear wheels of the vehicle, are used to determine an optical axis value or a light quantity, along with the values measured by the A and B measuring units.

That is, when the front and rear portions of the vehicle are not aligned in a row, the optical axis of light transmitted to the aiming unit 3 is deviated. The inclination extent of the optical axis is determined by comparing the values measured at the front of the vehicle by the A and B measuring units with the values measured at the rear of the vehicle by the C and D measuring units. When the optical axis is deviated, the light quantity is reduced, in comparison with the case where light enters the aiming unit 3 while the optical axis is horizontal. Thus, the light quantity may be calibrated in proportion to the extent where the optical axis is deviated.

As such, when the aiming unit 3 is aligned with the center of a headlamp to be measured, the light intensity, the optical axis, the light quantity, etc. of the headlamp are measured by the aiming unit 3. If an error is found, a worker adjusts the headlamp of the vehicle correctly.

When the aiming operation for the left headlamp is completed, the aiming unit 3 moves to the right of the vehicle, thus performing the aiming operation for the right headlamp. In this way, the headlamp aiming operation is completed. Thereafter, the vehicle is released from the wheel alignment measuring device 7.

As apparent from the foregoing, there is an advantage in the present invention in that it is capable of appropriately calibrating the moving quantity of an aiming unit, based on data measured by distance measuring units measuring the positions of respective wheels of a vehicle, during a headlamp aiming operation, thus accurately aligning the center of the headlamp with the center of the headlamp aiming apparatus.

Therefore, the operation of adjusting the vehicle headlamp is reliably conducted, thus correctly adjusting the headlamp of the vehicle.

What is claimed is:

1. A headlamp aiming apparatus for vehicles, comprising:
   a distance measuring unit mounted on each of four measuring panels of a wheel alignment measuring device having a vehicle centering function;
   a guide rail horizontally installed in front of the wheel alignment measuring device;
   an aiming unit installed to be rectilinearly moved along the guide rail and to measure properties of light emitted from a headlamp; and
   a controller to control the aiming unit.

2. The headlamp aiming apparatus as defined in claim 1, wherein said distance measuring unit comprises a laser distance measuring unit using a laser.

3. The headlamp aiming apparatus as defined in claim 1, wherein
   a stopper is installed at a predetermined position on the guide rail, a limit switch is mounted on the aiming unit, and contacts the stopper so as to be operated in cooperation with the stopper, and the controller moves the aiming unit along the guide rail, depending on a signal generated when the limit switch contacts the stopper and on data measured by the distance measuring unit.

4. The headlamp aiming apparatus of claim 1, wherein the controller to control the aiming unit is based on data measured by the distance measuring unit.

* * * * *